US010311638B2

(12) United States Patent
Da Veiga et al.

(10) Patent No.: US 10,311,638 B2
(45) Date of Patent: Jun. 4, 2019

(54) ANTI-TRIP WHEN IMMERSED IN A VIRTUAL REALITY ENVIRONMENT

(71) Applicant: Microsoft Technology Licensing, LLC, Redmond, WA (US)

(72) Inventors: Alexandre Da Veiga, Bellevue, WA (US); Ben Sugden, Redmond, WA (US); Laura Massey, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 433 days.

(21) Appl. No.: 14/600,774

(22) Filed: Jan. 20, 2015

(65) Prior Publication Data

US 2016/0027212 A1 Jan. 28, 2016

Related U.S. Application Data

(60) Provisional application No. 62/029,351, filed on Jul. 25, 2014.

(51) Int. Cl.
*H04N 13/332* (2018.01)
*G06T 19/00* (2011.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ........................... G01C 15/00; G02B 27/0093
See application file for complete search history.

(56) References Cited

U.S. PATENT DOCUMENTS

| 5,748,189 A | 5/1998 | Trueblood |
| 5,819,206 A | 10/1998 | Horton et al. |
| (Continued) | | |

FOREIGN PATENT DOCUMENTS

| CN | 1922651 A | 2/2007 |
| CN | 101162524 A | 4/2008 |
| (Continued) | | |

OTHER PUBLICATIONS

"International Search Report and Written Opinion Issued in PCT Application No. PCT/US2015/041865", dated Jan. 25, 2016, 12 Pages.
(Continued)

*Primary Examiner* — Jitesh Patel
(74) *Attorney, Agent, or Firm* — Mark K. Young; Mayer & Williams PC

(57) ABSTRACT

An HMD device with a see-through display and depth sensing capability is configured to selectively dim or fade out a display of a virtual reality environment to enable a user to see the real world without obstruction by the virtual world when a distance between the user and a real world object is determined to be less than a threshold distance. The current height of the user's head (i.e., the distance from head to ground) may be utilized when performing the dimming/fading so that different threshold distances can be used depending on whether the user is standing or seated.

17 Claims, 16 Drawing Sheets

(51) Int. Cl.

| | | |
|---|---|---|
| *G06F 3/0487* | (2013.01) | |
| *G06F 3/01* | (2006.01) | |
| *G06F 3/0481* | (2013.01) | |
| *G02B 27/01* | (2006.01) | |
| *G06T 15/08* | (2011.01) | |
| *G06T 19/20* | (2011.01) | |
| *H04N 13/344* | (2018.01) | |
| *H04N 13/239* | (2018.01) | |
| *H04N 13/00* | (2018.01) | |
| *G02B 27/00* | (2006.01) | |

(52) U.S. Cl.
CPC .............. *G06F 3/011* (2013.01); *G06F 3/012* (2013.01); *G06F 3/013* (2013.01); *G06F 3/0487* (2013.01); *G06F 3/04815* (2013.01); *G06T 15/08* (2013.01); *G06T 19/20* (2013.01); *H04N 13/239* (2018.05); *H04N 13/332* (2018.05); *H04N 13/344* (2018.05); *G02B 27/0093* (2013.01); *G02B 2027/014* (2013.01); *G02B 2027/0138* (2013.01); *G02B 2027/0178* (2013.01); *G02B 2027/0187* (2013.01); *H04N 2013/0081* (2013.01)

(56) References Cited

U.S. PATENT DOCUMENTS

| | | | |
|---|---|---|---|
| 5,877,748 | A | 3/1999 | Redlich |
| 6,012,926 | A | 1/2000 | Hodges et al. |
| 6,023,275 | A | 2/2000 | Horvitz et al. |
| 6,329,986 | B1 | 12/2001 | Cheng |
| 6,396,495 | B1 | 5/2002 | Parghi et al. |
| 6,396,497 | B1 | 5/2002 | Reichlen |
| 6,529,331 | B2 | 3/2003 | Massof et al. |
| 6,552,698 | B1 | 4/2003 | Walker |
| 6,741,241 | B1 | 5/2004 | Jaubert et al. |
| 6,804,607 | B1* | 10/2004 | Wood ............... G01S 3/784 180/167 |
| 6,898,266 | B2 | 5/2005 | Griffith |
| 7,274,380 | B2 | 9/2007 | Navab et al. |
| 7,386,799 | B1 | 6/2008 | Clanton et al. |
| 7,400,322 | B1 | 7/2008 | Urbach |
| 7,486,817 | B2 | 2/2009 | Yanagawa et al. |
| 7,538,775 | B2 | 5/2009 | Ishihara |
| 7,542,210 | B2 | 6/2009 | Chirieleison, Sr. |
| 7,557,774 | B2 | 7/2009 | Baudisch et al. |
| 8,049,750 | B2 | 11/2011 | Gloudemans et al. |
| 8,266,536 | B2 | 9/2012 | Roberts et al. |
| 8,405,680 | B1* | 3/2013 | Cardoso Lopes ....... G06T 19/00 345/426 |
| 8,576,247 | B2 | 11/2013 | Avkarogullari et al. |
| 8,611,015 | B2 | 12/2013 | Wheeler et al. |
| 8,751,969 | B2 | 6/2014 | Matsuda et al. |
| 8,754,931 | B2 | 6/2014 | Gassel et al. |
| 8,780,014 | B2 | 7/2014 | Border et al. |
| 8,793,620 | B2 | 7/2014 | Stafford |
| 9,372,345 | B2 | 6/2016 | Fujimaki |
| 9,443,352 | B1 | 9/2016 | Glover |
| 9,645,397 | B2 | 5/2017 | da Veiga et al. |
| 9,776,460 | B2 | 10/2017 | Mita |
| 9,858,720 | B2 | 1/2018 | da Veiga et al. |
| 9,865,089 | B2 | 1/2018 | Burns et al. |
| 9,904,055 | B2 | 2/2018 | Burns et al. |
| 2001/0035845 | A1 | 11/2001 | Zwern |
| 2002/0044152 | A1 | 4/2002 | Abbott et al. |
| 2002/0154214 | A1 | 10/2002 | Scallie et al. |
| 2002/0181115 | A1 | 12/2002 | Massof et al. |
| 2003/0091226 | A1 | 5/2003 | Cahill |
| 2005/0024388 | A1 | 2/2005 | Takemoto |
| 2005/0143887 | A1* | 6/2005 | Kinoshita ............ G08G 1/166 701/45 |
| 2005/0179703 | A1 | 8/2005 | Johnson |
| 2006/0050070 | A1 | 3/2006 | Matsui |
| 2006/0092178 | A1 | 5/2006 | Tanguay, Jr. |
| 2006/0095207 | A1* | 5/2006 | Reid ............... G01S 11/12 701/301 |
| 2006/0241827 | A1* | 10/2006 | Fukuchi ............. G05D 1/0251 701/23 |
| 2006/0284792 | A1 | 12/2006 | Foxlin |
| 2007/0057946 | A1* | 3/2007 | Albeck ............... G01B 11/2513 345/427 |
| 2007/0116326 | A1* | 5/2007 | Aonuma ................ A63F 13/10 382/100 |
| 2007/0132662 | A1 | 6/2007 | Morita |
| 2008/0174659 | A1 | 7/2008 | McDowall |
| 2008/0195315 | A1 | 8/2008 | Hu |
| 2008/0284864 | A1 | 11/2008 | Kotake |
| 2009/0160985 | A1* | 6/2009 | Javidi ................ G06K 9/00214 348/294 |
| 2009/0167785 | A1 | 7/2009 | Wong |
| 2009/0189974 | A1 | 7/2009 | Deering |
| 2009/0199275 | A1 | 8/2009 | Brock et al. |
| 2009/0325699 | A1* | 12/2009 | Delgiannidis .......... A63F 13/06 463/32 |
| 2010/0208035 | A1* | 8/2010 | Pinault ............... G06K 9/00362 348/46 |
| 2010/0208057 | A1 | 8/2010 | Meier |
| 2010/0226017 | A1 | 9/2010 | Spaller |
| 2010/0315413 | A1 | 12/2010 | Izadi et al. |
| 2011/0029903 | A1 | 2/2011 | Schooleman et al. |
| 2011/0043627 | A1 | 2/2011 | Werling et al. |
| 2011/0140994 | A1 | 6/2011 | Noma |
| 2011/0242090 | A1 | 10/2011 | Keating et al. |
| 2012/0011445 | A1 | 1/2012 | Gilboa |
| 2012/0052917 | A1 | 3/2012 | Kim |
| 2012/0056876 | A1 | 3/2012 | Lee et al. |
| 2012/0068913 | A1 | 3/2012 | Bar-Zeev et al. |
| 2012/0092328 | A1 | 4/2012 | Flaks |
| 2012/0113092 | A1 | 5/2012 | Bar-Zeev et al. |
| 2012/0195471 | A1* | 8/2012 | Newcombe ............ G06T 7/194 382/106 |
| 2012/0237116 | A1 | 9/2012 | Xiao |
| 2012/0249741 | A1 | 10/2012 | Maciocci |
| 2012/0309522 | A1 | 12/2012 | Westlund et al. |
| 2012/0313839 | A1 | 12/2012 | Smithwick |
| 2012/0327116 | A1 | 12/2012 | Liu et al. |
| 2013/0044128 | A1 | 2/2013 | Liu et al. |
| 2013/0050258 | A1 | 2/2013 | Liu et al. |
| 2013/0050432 | A1 | 2/2013 | Perez et al. |
| 2013/0083007 | A1 | 4/2013 | Geisner et al. |
| 2013/0083018 | A1 | 4/2013 | Geisner |
| 2013/0088413 | A1 | 4/2013 | Raffle et al. |
| 2013/0093789 | A1 | 4/2013 | Liu et al. |
| 2013/0127860 | A1 | 5/2013 | Hadap |
| 2013/0127980 | A1 | 5/2013 | Haddick |
| 2013/0137076 | A1 | 5/2013 | Perez et al. |
| 2013/0141419 | A1 | 6/2013 | Mount |
| 2013/0147686 | A1 | 6/2013 | Clavin et al. |
| 2013/0194259 | A1 | 8/2013 | Bennett et al. |
| 2013/0222647 | A1 | 8/2013 | Ishihara |
| 2013/0257751 | A1 | 10/2013 | Stafford |
| 2013/0257899 | A1 | 10/2013 | Baron et al. |
| 2013/0287290 | A1 | 10/2013 | Owechko |
| 2013/0300637 | A1 | 11/2013 | Smits et al. |
| 2013/0307855 | A1 | 11/2013 | Lamb et al. |
| 2013/0326364 | A1 | 12/2013 | Latta et al. |
| 2013/0328927 | A1 | 12/2013 | Mount et al. |
| 2013/0335301 | A1* | 12/2013 | Wong ................ G02B 27/0093 345/8 |
| 2013/0335303 | A1 | 12/2013 | Maciocci et al. |
| 2013/0336629 | A1 | 12/2013 | Mulholland et al. |
| 2013/0342564 | A1 | 12/2013 | Kinnebrew et al. |
| 2013/0342570 | A1 | 12/2013 | Kinnebrew et al. |
| 2014/0002444 | A1 | 1/2014 | Bennett et al. |
| 2014/0019874 | A1 | 1/2014 | Li et al. |
| 2014/0049559 | A1 | 2/2014 | Fleck et al. |
| 2014/0098009 | A1* | 4/2014 | Prest ................ G02B 27/0176 345/8 |
| 2014/0104142 | A1 | 4/2014 | Bickerstaff et al. |
| 2014/0125557 | A1 | 5/2014 | Issayeva et al. |
| 2014/0130041 | A1 | 5/2014 | Luxenberg et al. |
| 2014/0132484 | A1 | 5/2014 | Pandey |

(56) References Cited

U.S. PATENT DOCUMENTS

| | | |
|---|---|---|
| 2014/0132715 A1 | 5/2014 | Raghoebardayal |
| 2014/0139639 A1* | 5/2014 | Wagner ............. H04N 13/0253 348/46 |
| 2014/0140579 A1 | 5/2014 | Takemoto |
| 2014/0145988 A1 | 5/2014 | Ishizawa |
| 2014/0168264 A1 | 6/2014 | Harrison |
| 2014/0176530 A1 | 6/2014 | Path re |
| 2014/0184550 A1 | 7/2014 | Hennessey et al. |
| 2014/0204117 A1 | 7/2014 | Kinnebrew et al. |
| 2014/0221090 A1 | 8/2014 | Mutschler et al. |
| 2014/0240351 A1 | 8/2014 | Scavezze et al. |
| 2014/0253605 A1 | 9/2014 | Border et al. |
| 2014/0267400 A1 | 9/2014 | Mabbutt |
| 2014/0317555 A1 | 10/2014 | Choi et al. |
| 2014/0363073 A1 | 12/2014 | Shirakyan |
| 2014/0372957 A1 | 12/2014 | Keane et al. |
| 2015/0070274 A1 | 3/2015 | Morozov |
| 2015/0091780 A1 | 4/2015 | Lyren |
| 2015/0138081 A1 | 5/2015 | Iwatsu et al. |
| 2015/0138239 A1 | 5/2015 | Kim |
| 2015/0143459 A1 | 5/2015 | Molnar |
| 2015/0145887 A1 | 5/2015 | Forutanpour |
| 2015/0153833 A1 | 6/2015 | Pinault et al. |
| 2015/0178956 A1 | 6/2015 | Davis |
| 2015/0186016 A1 | 7/2015 | Li |
| 2015/0205106 A1 | 7/2015 | Norden |
| 2015/0243078 A1 | 8/2015 | Watson |
| 2015/0261293 A1 | 9/2015 | Wilairat |
| 2015/0325176 A1 | 11/2015 | Koyama |
| 2015/0355709 A1 | 12/2015 | Lee et al. |
| 2015/0355735 A1 | 12/2015 | Matsuda |
| 2015/0356788 A1 | 12/2015 | Abe |
| 2016/0011724 A1 | 1/2016 | Wheeler et al. |
| 2016/0025981 A1 | 1/2016 | Burns et al. |
| 2016/0025982 A1 | 1/2016 | Sutherland et al. |
| 2016/0026242 A1 | 1/2016 | Burns et al. |
| 2016/0027213 A1 | 1/2016 | Burns et al. |
| 2016/0027214 A1 | 1/2016 | Memmott et al. |
| 2016/0027215 A1 | 1/2016 | Burns et al. |
| 2016/0027216 A1 | 1/2016 | da veiga et al. |
| 2016/0027217 A1 | 1/2016 | da veiga et al. |
| 2016/0027218 A1 | 1/2016 | Salter et al. |
| 2016/0314622 A1 | 10/2016 | Davis et al. |
| 2018/0003982 A1 | 1/2018 | Burns et al. |
| 2018/0101994 A1 | 4/2018 | Da veiga et al. |

FOREIGN PATENT DOCUMENTS

| | | |
|---|---|---|
| CN | 101529899 A | 9/2009 |
| CN | 101813976 A | 8/2010 |
| CN | 102419631 A | 4/2012 |
| CN | 102473068 A | 5/2012 |
| CN | 102598677 A | 7/2012 |
| CN | 101540020 B | 9/2012 |
| CN | 102663722 A | 9/2012 |
| CN | 102918568 A | 2/2013 |
| CN | 102959616 A | 3/2013 |
| CN | 103064188 A | 4/2013 |
| CN | 103076875 A | 5/2013 |
| CN | 103091844 A | 5/2013 |
| CN | 103377476 A | 10/2013 |
| CN | 103460256 A | 12/2013 |
| CN | 103487937 A | 1/2014 |
| CN | 103493106 A | 1/2014 |
| CN | 103635849 A | 3/2014 |
| CN | 103761085 A | 4/2014 |
| CN | 106662924 A | 5/2017 |
| EP | 1521482 A2 | 4/2005 |
| EP | 2164045 A2 | 3/2010 |
| JP | 2013238693 A | 11/2013 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

"International Search Report & Written Opinion Issued in PCT Patent Application No. PCT/US2015/041866", dated Nov. 27, 2015, 12 Pages.

"International Preliminary Report on Patentability Issued in PCT Application No. PCT/US2015/041868", dated Oct. 13, 2016, 8 Pages.

"International Preliminary Report on Patentability Issued in PCT Application No. PCT/US2015/041863", dated Oct. 13, 2016, 8 Pages.

"International Preliminary Report on Patentability Issued in PCT Application No. PCT/US2015/041862", dated Oct. 13, 2016, 6 Pages.

"International Preliminary Report on Patentability Issued in PCT Application No. PCT/US2015/041861", dated Oct. 13, 2016, 7 Pages.

"International Preliminary Report on Patentability Issued in PCT Application No. PCT/US2015/041865", dated Oct. 19, 2016, 7 Pages.

"International Preliminary Report on Patentability Issued in PCT Application No. PCT/US2015/041866", dated Oct. 27, 2016, 9 Pages.

"Second Written Opinion Issued in PCT Application No. PCT/US2015/041866", dated Jun. 27, 2016, 7 Pages.

"Second Written Opinion Issued in PCT Application No. PCT/US2015/041865", dated Jun. 15, 2016, 8 Pages.

"Second Written Opinion Issued in PCT Application No. PCT/US2015/041868", dated Jul. 1, 2016, (6 Pages).

"Second Written Opinion Issued in PCT Application No. PCT/US2015/041862", dated Jun. 13, 2016, 5 Pages.

"Second Written Opinion Issued in PCT Application No. PCT/US2015/041863", dated Jun. 15, 2016, 7 Pages.

"Second Written Opinion Issued in PCT Application No. PCT/US2015/041861", dated Jun. 20, 2016, 6 Pages.

Duchowski, Andrew, "Chapter 7—Head-Mounted System Software Development", In Book Eye Tracking Methodology, Theory and Practice, Part 2, Jan. 1, 2007, pp. 69-86. (18 pages total).

"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © 2000 IEEE) (10 pages total).

Maimone, et al., "Computational Augmented Reality Eyeglasses", In Proceedings of IEEE International Symposium on Mixed and Augmented Reality, Oct. 1, 2013, 10 pages.

"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).

"International Search Report and Written Opinion Issued in PCT Patent Application No. PCT/US2015/041861", dated Oct. 30, 2015, (11 pages total).

"International Search Report & Written Opinion Issued in PCT Application No. PCT/US2015/041862", dated Nov. 16, 2015, (11 Pages total).

"International Search Report & Written Opinion Received for PCT Application No. PCT/US2015/041863",dated Nov. 16, 2015, (12 Pages total).

"International Search Report and Written Opinion Issued in PCT Application No. PCT/US2015/041867", dated Nov. 25, 2015, (11 Pages total).

"International Preliminary Report on Patentability Issued in PCT Application No. PCT/US2015/041868", dated Oct. 28, 2015, (10 Pages total).

(56) References Cited

OTHER PUBLICATIONS

"International Preliminary Report on Patentability Issued in PCT Application No. PCT/US2015/041864", dated Oct. 26, 2015, (11 Pages total).
Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.
Murray, et al., "Comparison of Head Gaze and Head and Eye Gaze within an Immersive Environment", In Tenth IEEE International Symposium on Distributed Simulation and Real-Time Applications , Oct. 2, 2006, 7 pages.
Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.
Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.
Ponto, et al., "Perceptual Calibration for Immersive Display Environments", In IEEE Transactions on Visualization and Computer Graphics, vol. 19, Issue 4, Apr. 2013, pp. 691-700, 10 pages.
Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.
Li, et al., "The Underestimation of Egocentric Distance: Evidence from Frontal Matching Tasks", In Proceedings of Attention, Perception & Psychophysics, Oct. 2011, 15 pages.
Howe, Bo, "Holographic Computer Monitor", Published on: Aug. 18, 2010, Available at: www.youtube.com/watch?v=tHlxj7fY-38, 2 pages.
Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.
Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.
Chen, Jian, "A Virtual Environment System for the Comparative Study of Dome and HMD", In Master Thesis, Department of Computer Science, University of Houston, May 2002, 104 pages.
McCarthy, Mike, "HP intros new versions of its mobile and tower workstations", Retrieved on: Sep. 11, 2014, Available at: http://postperspective.com/hp-intros-new-versions-pro-offerings/, 5 pages.
Nakashima, et al., "A 2D-3D Integrated Environment for Cooperative Work", In Proceedings of the Virtual Reality Software and Technology, Nov. 7, 2005, 7 pages.
Pierce, et al., "Image Plane Interaction Techniques in 3D Immersive Environments", In Proceedings of the symposium on Interactive 3D graphics, Apr. 30, 1997, 10 pages.
Regenbrecht, et al., "Interaction in a Collaborative Augmented Reality Environment", In Proceedings of CHI Extended Abstracts on Human Factors in Computing Systems, Apr. 20, 2002, 2 pages.
"Touchscreen interface for seamless data transfer between the real and virtual worlds", Published on: Apr. 15, 2013, Available at: http://www.diginfo.tv/v/13-0025-r-en.php, 8 pages.
Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.
Steinicke, et al., "Natural Perspective Projections for Head-Mounted Displays", In IEEE Transactions on Visualization and Computer Graphics, Jul. 2011, 12 pages.
Hogue, David, "What Are Index and Alpha Transparency?", Published on: Mar. 3, 2011, Available at: http://www.idux.com/2011/02/27/what-are-index-and-alpha-transparency/, 14 pages.
Jimenez, et al., "Gaze-based Interaction for Virtual Environments", In Journal of Universal Computer Science, vol. 14, Issue 19, Nov. 2008, 14 pages.
Kinoshita, et al., "A Fast and Robust 3D Head Pose and Gaze Estimation System", In 8th IEEE International Conference on Automatic Face & Gesture Recognition, Sep. 17, 2008, 2 pages.
Peterson, et al., "Evaluation of Alternative Label Placement Techniques in Dynamic Virtual Environments", In Proceedings of the 10th International Symposium on Smart Graphics, May 22, 2009, 7 pages.
Kuhl, et al., "HMD Calibration and its Effects on Distance Judgments", In Proceedings of the 5th symposium on Applied perception in graphics and visualization, Aug. 9, 2008, 24 pages.
Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.
Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.
Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.
Nóbrega, et al., "Magnetic Augmented Reality: Virtual Objects in Your Space", In Proceedings of the International Working Conference on Advanced Visual Interfaces, May 21, 2012, pp. 332-335, 4 pages.
Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.
Kalkofen, et al., "Visualization Techniques for Augmented Reality", In Proceedings of Handbook of Augmented Reality, Jul. 13, 2011, pp. 65-98, 34 pages.
Non-Final Office Action received in U.S. Appl. No. 15/679,997, dated Oct. 19, 2017, 41 pages.
Final Office Action received in U.S. Appl. No. 14/722,942, dated Nov. 24, 2017, 14 pages.
Notice of Allowance received in U.S. Appl. No. 14/612,850, dated Oct. 12, 2017, 9 pages.
"Non Final Office Action Issued in U.S. Appl. No. 14/611,447", dated Dec. 27, 2016, 20 Pages.
"Notice of Allowance Issued in U.S. Appl. No. 14/611,447", dated Aug. 16, 2017, 2 Pages.
"Notice of Allowance Issued in U.S. Appl. No. 14/611,447", dated May 16, 2017, 5 Pages.
"Final Office Action Issued in U.S. Appl. No. 14/628,539", dated Apr. 7, 2017, 20 Pages.
"Final Office Action Issued in U.S. Appl. No. 14/628,539", dated Jan. 22, 2018, 29 Pages.
"Non Final Office Action Issued in U.S. Appl. No. 14/723,065", dated Jul. 24, 2017, 38 Pages.
"Non-Final Office Action Issued in U.S. Appl. No. 14/628,539", dated Sep. 14, 2017, 24 Pages.
"Non-Final Office Action Issued in U.S. Appl. No. 14/628,539", dated Nov. 17, 2016, 17 Pages.
"Final Office Action Issued in U.S. Appl. No. 14/723,065", dated Dec. 21, 2017, 42 Pages.
"Final Office Action Issued in U.S. Appl. No. 14/723,065", dated Feb. 7, 2017, 37 Pages.
"Non Final Office Action Issued in U.S. Appl. No. 14/723,065", dated Sep. 26, 2016, 29 Pages.
"Non Final Office Action issued in U.S. Appl. No. 14/628,539", dated Jun. 27, 2018, 29 Pages.
"Final Office Action Issued in U.S. Appl. No. 14/697,109", dated May 17, 2018, 23 Pages.
"Non Final Office Action Issued in U.S. Appl. No. 14/723,065", dated May 2, 2018, 41 Pages.
"Final Office Action Issued in U.S. Appl. No. 14/612,850", dated Jan. 12, 2017, 15 Pages.
"Non Final Office Action Issued in U.S. Appl. No. 14/612,850", dated Jun. 26, 2017, 15 Pages.

(56) References Cited

OTHER PUBLICATIONS

"Non Final Office Action Issued in U.S. Appl. No. 14/612,850", dated Jun. 23, 2016, 17 Pages.
"Final Office Action Issued in U.S. Appl. No. 14/688,695", dated Nov. 4, 2016, 21 Pages.
"Non Final Office Action Issued in U.S. Appl. No. 14/688,695", dated Mar. 20, 2017, 24 Pages.
"Non Final Office Action Issued in U.S. Appl. No. 14/688,695", dated Jul. 12, 2016, 20 Pages.
"Notice of Allowance Issued in U.S. Appl. No. 14/688,695", dated Aug. 29, 2017, 12 Pages.
"Final Office Action Issued in U.S. Appl. No. 14/688,817", dated Dec. 22, 2016, 56 Pages.
"Non Final Office Action Issued in U.S. Appl. No. 14/688,817", dated Mar. 23, 2017, 57 Pages.
"Non Final Office Action Issued in U.S. Appl. No. 14/688,817", dated Aug. 4, 2016, 50 Pages.
"Final Office Action Issued in U.S. Appl. No. 14/697,109", dated Jun. 16, 2017, 19 Pages.
"Non Final Office Action Issued in U.S. Appl. No. 14/697,109", dated Oct. 4, 2017, 17 Pages.
"Non Final Office Action Issued in U.S. Appl. No. 14/697,109", dated Jan. 3, 2017, 19 Pages.
"Non Final Office Action Issued in U.S. Appl. No. 14/697,227", dated Aug. 12, 2016, 17 Pages.
"Final Office Action Issued in U.S. Appl. No. 14/722,942", dated Sep. 19, 2018, 11 Pages.
"Non Final Office Action Issued in U.S. Appl. No. 14/722,942", dated Jul. 11, 2017, 11 Pages.
"Non Final Office Action Issued in U.S. Appl. No. 14/722,942", dated Apr. 4, 2018, 12 Pages.
"Final Office Action Issued in U.S. Appl. No. 15/679,997", dated Apr. 5, 2018, 17 Pages.
"Non Final Office Action Issued in U.S. Appl. No. 15/841,047", dated Jan. 25, 2018, 60 Pages.
"Office Action Issued in Chinese Patent Application No. 201580041327.6", dated Dec. 5, 2018, 20 Pages.
"Office Action Issued in Chinese Patent Application No. 201580041345.4", dated Dec. 5, 2018, 19 Pages.
"Office Action Issued in Chinese Patent Application No. 201580041348.8", dated Nov. 30, 2018, 15 Pages.
"Office Action Issued in Chinese Patent Application No. 201580041349.2", dated Dec. 5, 2018, 19 Pages.
"Office Action Issued in Chinese Patent Application No. 201580041369.X", dated Dec. 6, 2018, 10 Pages.
"Office Action Issued in Colombian Patent Application No. NC2017/0000546", dated Apr. 13, 2018, 14 Pages. (w/o English Translation).
"Office Action Issued in Colombian Patent Application No. NC2017/0000546", dated Jan. 25, 2017, 2 Pages. (w/o English Translation).
"Office Action Issued in Colombian Patent Application No. NC2017/0000546", dated Sep. 14, 2018, 3 Pages.
"Non Final Office Action Issued in U.S. Appl. No. 15/679,997", dated Dec. 13, 2018, 15 Pages.
"Office Action Issued in Chinese Patent Application No. 201580041151.4", dated Dec. 21, 2018, 29 Pages.
"Office Action Issued in Chinese Patent Application No. 201580041403.3", dated Dec. 21, 2018, 18 Pages.
"Office Action Issued in European Patent Application No. 15748368.6", dated Feb. 15, 2019, 5 Pages.
"Office Action Issued in European Patent Application No. 15748367.8", dated Apr. 8, 2019, 6 Pages.
First Office Action and Search Report Issued in Chinese Patent Application No. 201580041217.X, dated Feb. 28, 2019, 22 Pages.

* cited by examiner

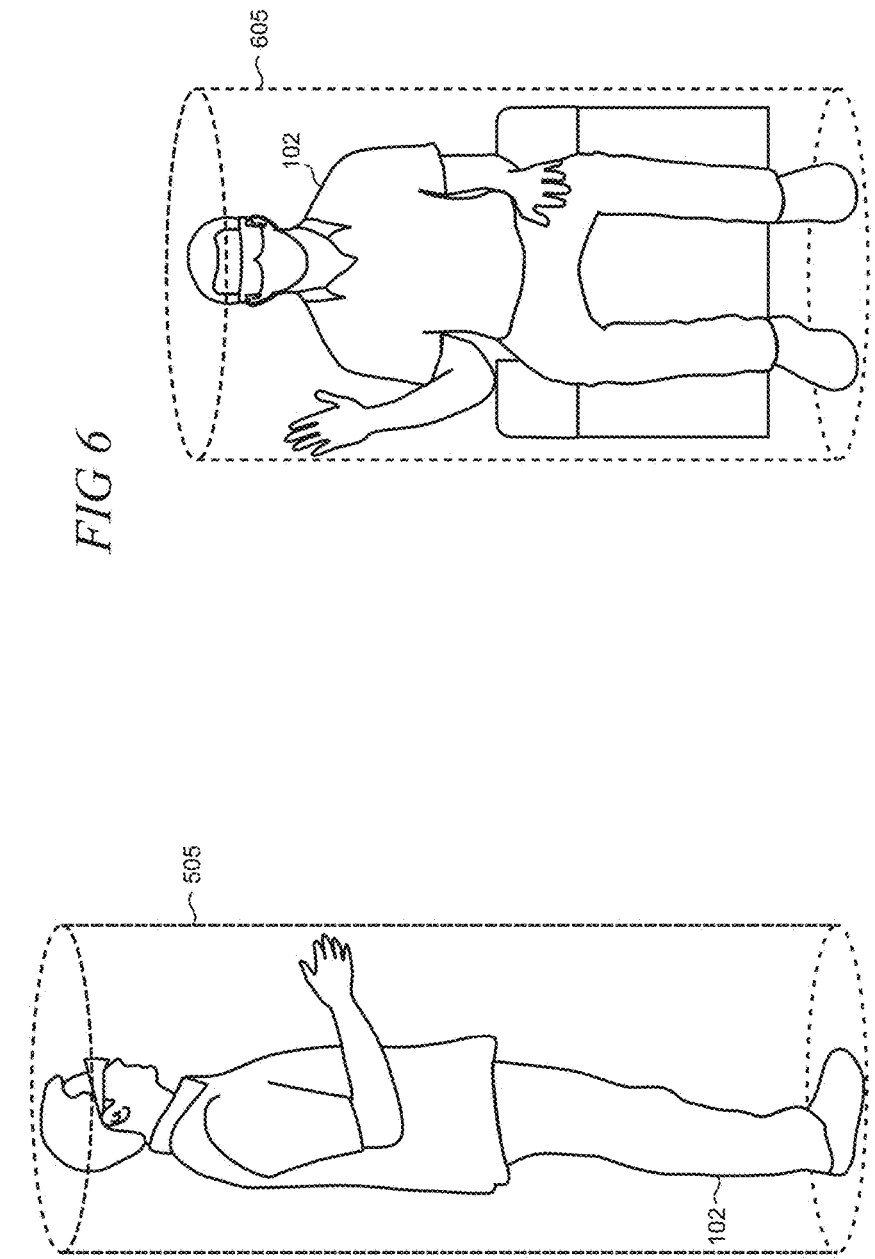

ANTI-TRIP WHEN IMMERSED IN A VIRTUAL REALITY ENVIRONMENT

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Mixed reality computing devices, such as head mounted display (HMD) systems and handheld mobile devices (e.g. smart phones, tablet computers, etc.), may be configured to display information to a user about virtual and/or real objects in the field of view of the user and/or a field of view of a camera of the device. For example, an HMD device may be configured to display, using a see-through display system, virtual environments with real world objects mixed in, or real world environments with virtual objects mixed in. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An HMD device with a see-through display and depth sensing capability is configured to selectively dim or fade out a display of a virtual reality environment to enable a user to see the real world without obstruction by the virtual world when a distance between the user and a real world object is determined to be less than a threshold distance. The current height of the user's head (i.e., the distance from head to ground) may be utilized when performing the dimming/fading so that different threshold distances can be used depending on whether the user is standing or seated.

In various illustrative examples, surface reconstruction data or depth data is captured by the HMD device using a depth sensor or by determining depth from stereo imaging to dynamically measure the distance between the user and real world objects as well as estimate the user's height. The user may be represented using a volumetric shape such as a cylinder or capsule that is sized according to the user's height. The threshold distance between the real world object and volumetric shape representing the user at which the dimming/fading of the display is performed can be smaller when the user is seated and be larger when the user is standing. Variable thresholds may be utilized in recognition of the smaller safety hazard to the user when bumping into or touching the real world object when seated as compared to such object interaction when standing or walking, which could result in a trip and fall.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIGS. 5 and 6 show the user being represented by an illustrative volumetric shape that is sized according the user's height;

Like reference numerals indicate like elements in the drawings. Elements are not drawn to scale unless otherwise indicated.

DETAILED DESCRIPTION

Figure 1:
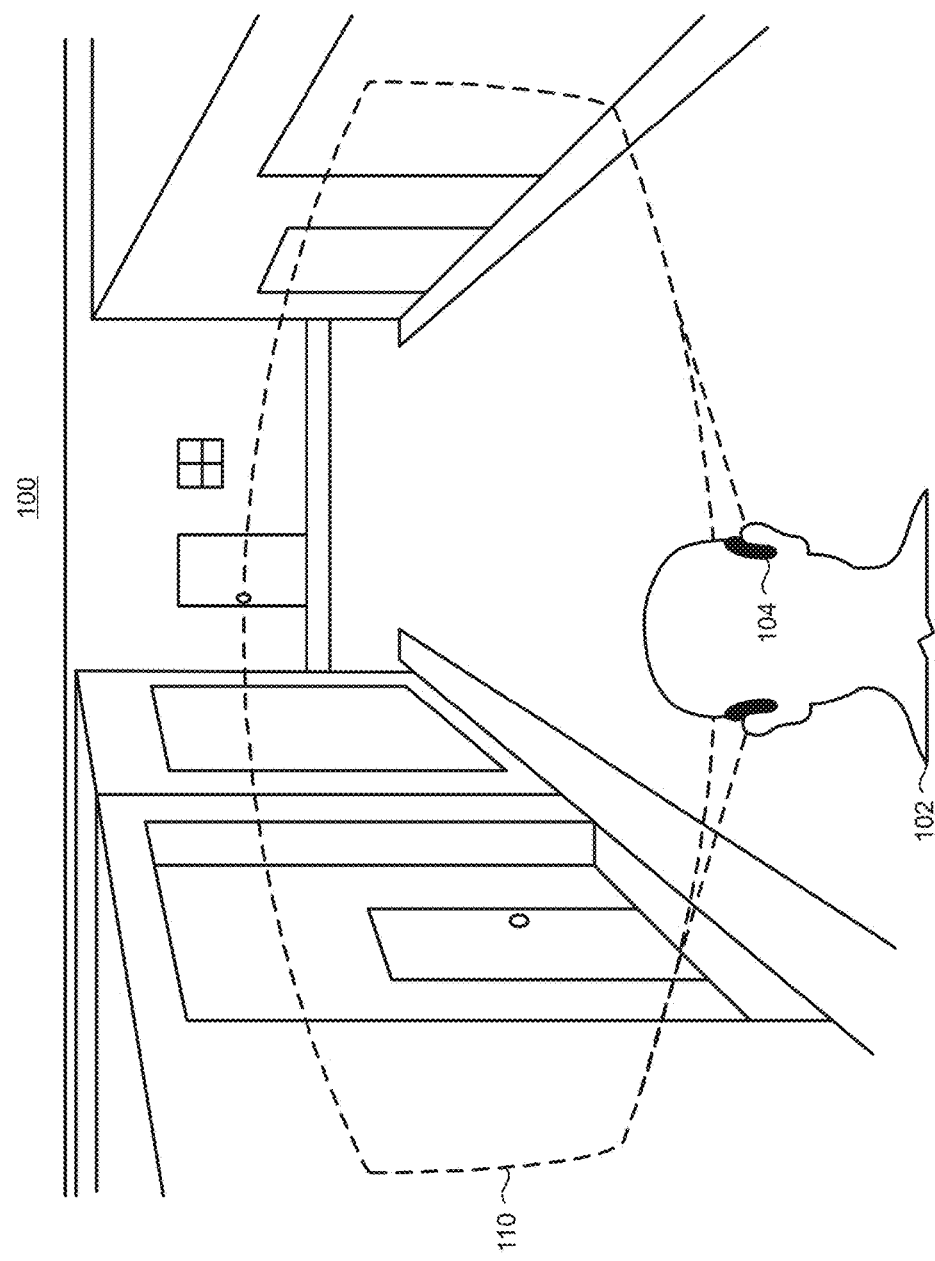
FIG. 1 shows an illustrative virtual reality environment, a portion of which is rendered within the view of a user of an HMD device.

When experiencing a mixed or virtual reality environment while using an HMD device, users can bump into or trip over physical objects when they move around in a real world space because the virtual world is obscuring their view. In an illustrative example, as shown in FIG. 1, a user 102 can employ a see-through HMD device 104 to experience a virtual reality environment 100 that is rendered visually and may include audio and/or tactile/haptic sensations in some implementations. In this particular non-limiting example, the virtual reality environment 100 includes city streets with various buildings, stores, etc. that the user 102 can see and interact with. As the user changes the position or orientation of his head and/or moves within real world space, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual world.

Figure 2:
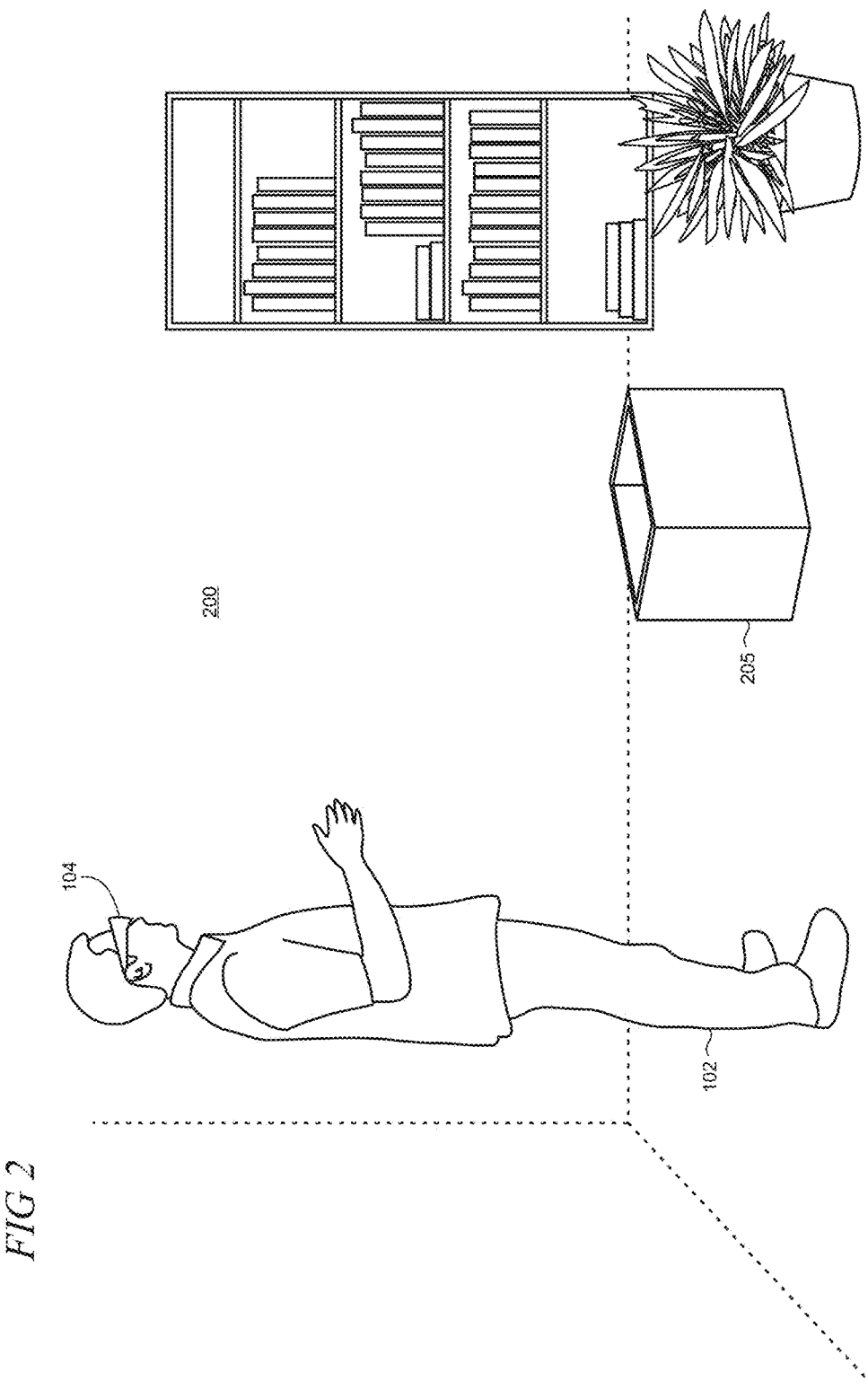
FIG. 2 shows an illustrative real world environment in which a user of an HMD device is located.

As shown in FIG. 2, the physical, real world space 200 that the user occupies when using the HMD device 104 can include various objects (representatively indicated by reference numeral 205) that could present trip hazards to the user or otherwise interfere with the HMD user experience when touched or bumped into. In this illustrative example, the real world objects 205 are not incorporated into the virtual reality environment 100 (shown in FIG. 1) and therefore are not normally visible to the user on the HMD device 104.

Figure 3:
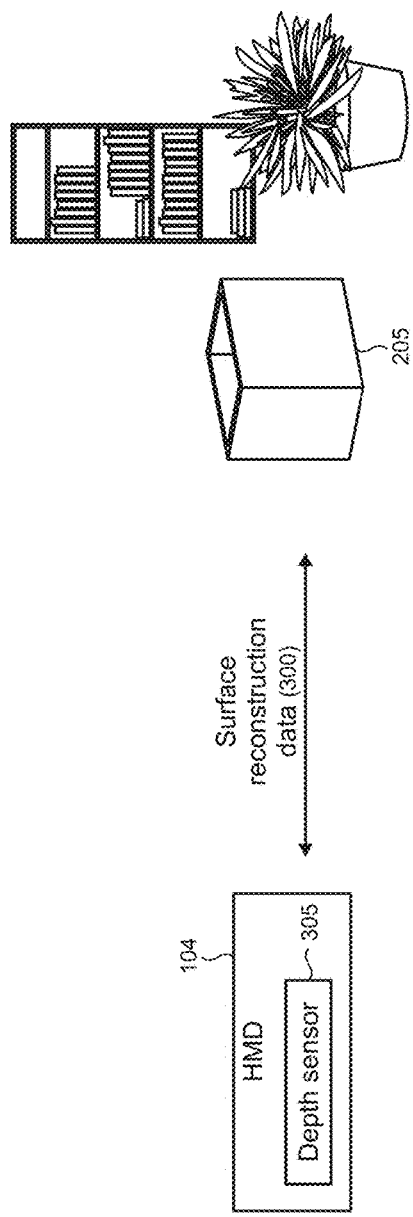
FIG. 3 depicts surface reconstruction data associated with real world objects being captured by an HMD device.

The present HMD device 104 can provide an anti-trip feature when the user is immersed in a virtual reality environment. As shown in FIG. 3, the device is configured to obtain surface reconstruction data 300 by using an integrated depth sensor 305 to sense the objects 205 in the real world space and determine their distance from the user. In alternative implementations, depth data can be derived using suitable stereoscopic image analysis techniques.

Figure 4:
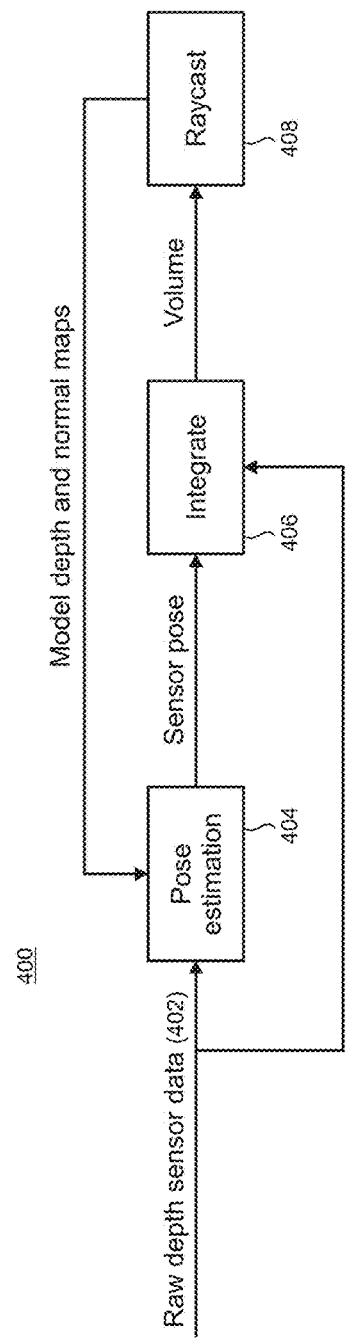
FIG. 4 shows a block diagram of an illustrative surface reconstruction pipeline.

FIG. 4 shows an illustrative surface reconstruction data pipeline 400 for obtaining surface reconstruction data for objects in the real world space. It is emphasized that the disclosed technique is illustrative and that other techniques and methodologies may be utilized depending on the requirements of a particular implementation. Raw depth sensor data 402 is input into a 3D (three-dimensional) pose estimate of the sensor (block 404). Sensor pose tracking can be achieved, for example, using ICP (iterative closest point) alignment between the predicted surface and current sensor measurement. Each depth measurement of the sensor can be integrated (block 406) into a volumetric representation using, for example, surfaces encoded as a signed distance field (SDF). Using a loop, the SDF is raycast (block 408) into the estimated frame to provide a dense surface prediction to which the depth map is aligned.

To determine when a user is close to real world objects, the HMD device 104 represents the user 102 as a volumetric shape, as shown in FIGS. 5 and 6. The volume can be selected from a variety of arbitrary shapes such as a capsule or a cylinder 505 as depicted in FIG. 5. The volumetric shape is sized according to the user's head location within the physical space so that the shape 605 is shorter when the user is seated as depicted in FIG. 6. The user's head location can be determined using any suitable technique including, for example, head tracking using the HMD's internal sensors, image analyses for estimating the user's head height from the floor, or with external/remote methods.

Figure 7:
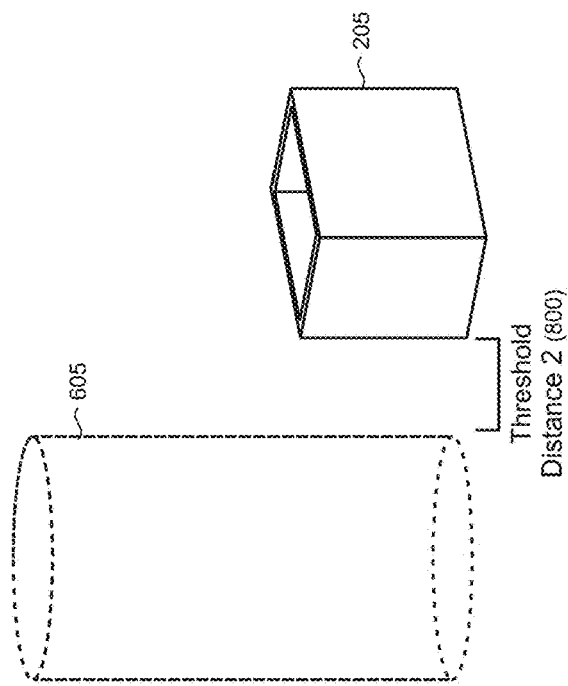
FIGS. 7 and 8 show illustrative threshold distances at which HMD displays are operated to show real world objects.
Figure 8:
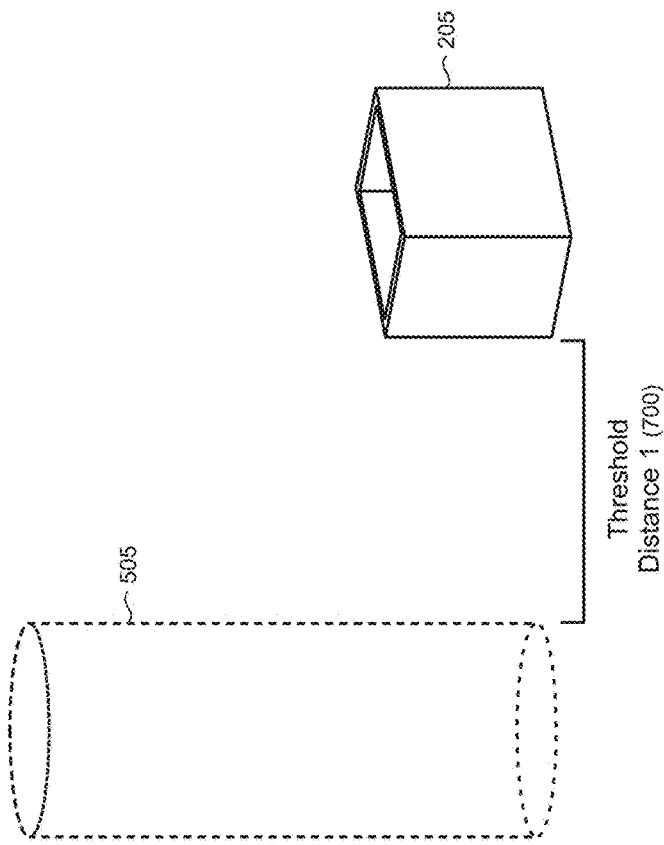

The threshold distance between the volumetric shape and the real world object at which the display in the HMD device is dimmed or faded to enable the user to see the object can vary according to the height of the user's head in the physical space (e.g., whether the user is standing/walking or seated). As shown in FIGS. 7 and 8, a Threshold Distance 1 (indicated by reference numeral 700) is associated with the taller volumetric shape 505 and is relatively larger than the Threshold Distance 2 (800) associated with the shorter shape 605.

Figure 9:
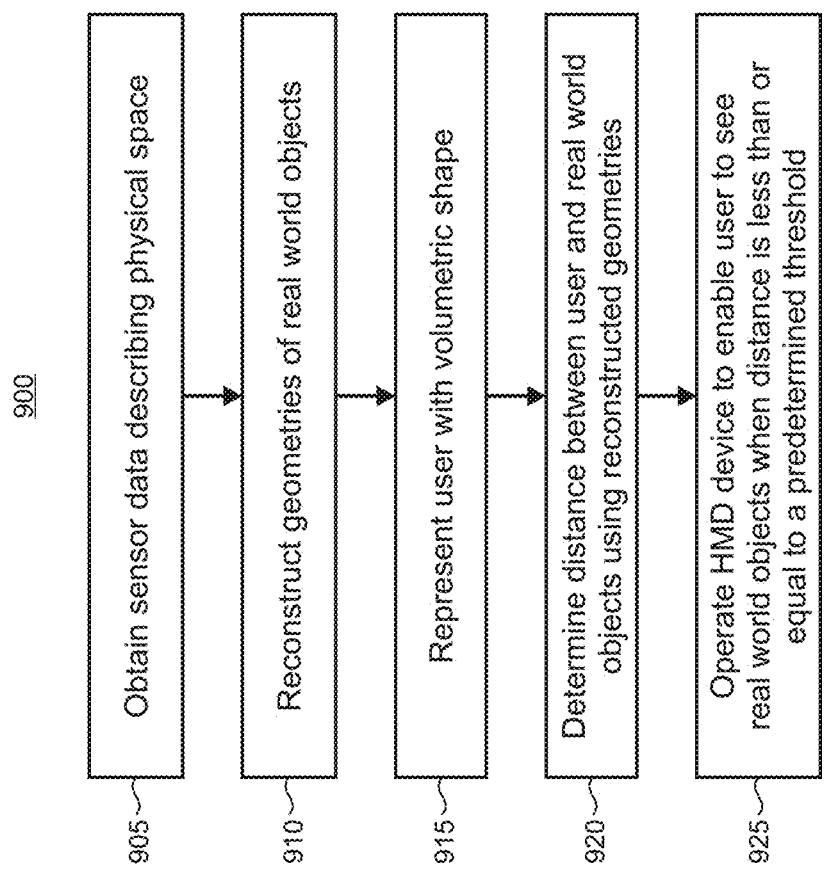
FIGS. 9, 10, and 11 are flowcharts of illustrative methods that may be performed using an HMD device.
Figure 10:
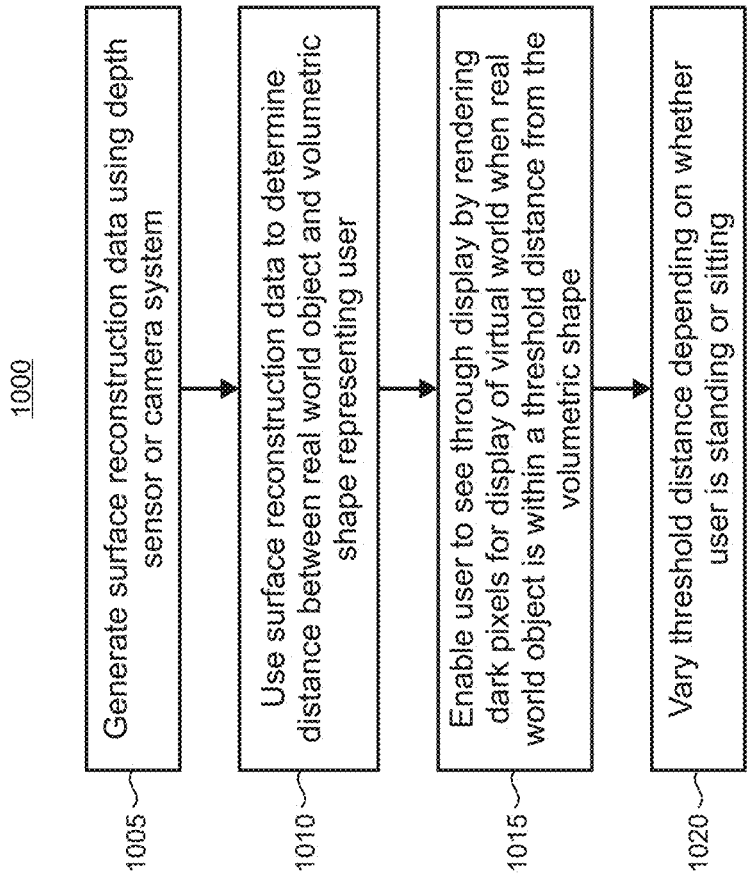
Figure 11:
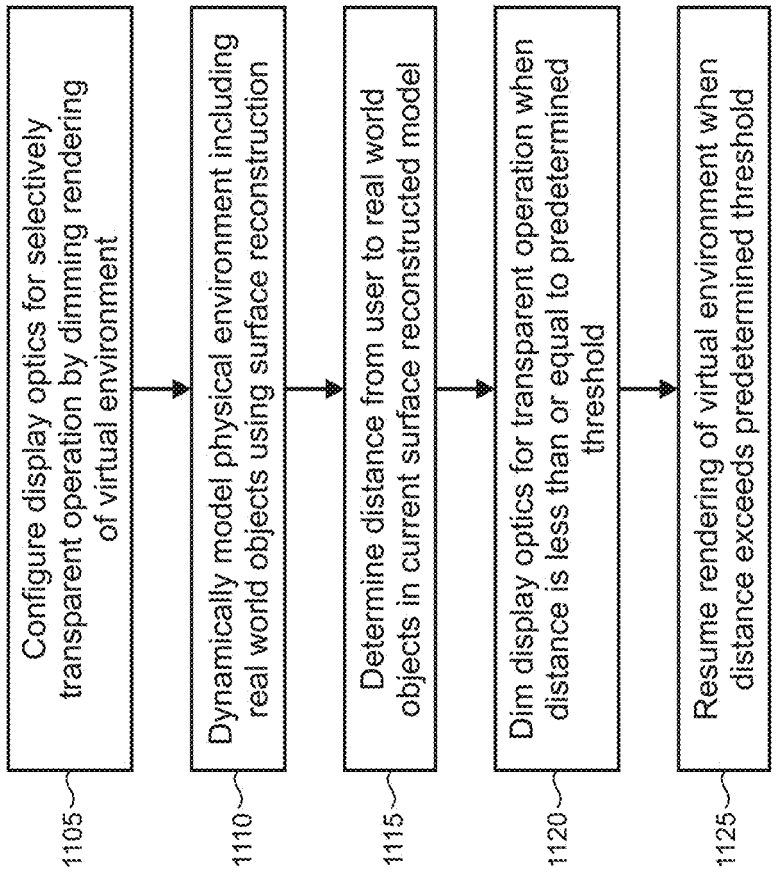

FIGS. 9, 10, and 11 are flowcharts of illustrative methods that may be performed using the HMD device 104. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 900 in FIG. 9 may be performed by an HMD device that supports rendering of a virtual reality environment. In step 905, sensor data is obtained which describes a physical space that adjoins a user of an HMD device. The sensor data can include, for example, depth data using a depth sensor that is integrated into the HMD device or be obtained from an external sensor or source. Depth-from-stereo imaging analyses may also be used to create depth data. In step 910, the sensor data is used to reconstruct geometries of real world objects in the physical space, for example, using surface reconstruction.

The user is represented with a volumetric shape in step 915 which may be used when determining, using the reconstructed geometries, a current distance between the user and real world objects in step 920. In step 925, the HMD device is operated so that the user can see the real world objects without obstruction from the virtual reality environment. Typically, the HMD device is operated so that there is no significant obstruction from the rendering of the virtual reality environment, but some partial obstruction may be acceptable in some implementations.

Method 1000 in FIG. 10 may be performed by an HMD device that employs a see-through display using additive blending in which pixels associated with a virtual reality scene are added to the "real world" pixel that it overlays. Accordingly, when a virtual color of black is rendered it is actually seen as transparent by the user and the real world view is unchanged when viewed through a black virtual pixel and there is typically no way to darken a real pixel in an additive display.

In step 1005, surface reconstruction data is generated using a depth sensor or camera system. In step 1010, the surface reconstruction data is used to determine a distance between a real world object in the physical environment and a volumetric shape that represents the user. Various suitable surface reconstruction techniques may be utilized including that shown in the pipeline in FIG. 4 in which multiple overlapping surfaces are integrated.

In step 1015, when the real world object is within a threshold distance, dark pixels are rendered on the additive display so that the user can see through the display and see the real world object. Typically, a sufficient portion of the display is rendered with dark pixels so that the view of the object is not significantly obscured by the virtual world. The threshold distance may be varied, in step 1020, depending on whether the user is standing or sitting.

Method 1100 in FIG. 11 may be performed by an HMD device having an optics display that can be switched from operating in a full virtual reality mode to operating transparently to show the physical environment to the user. Accordingly, the display of the virtual reality environment can be dimmed (i.e., faded) so that the display becomes transparent when a real world object is detected to fall within a predetermined distance threshold.

In step 1105, the display optics in the HMD device are configured for selectively transparent operation through dimming the rendering of the virtual reality environment. In step 1110, the physical environment is dynamically modeled using surface reconstruction. That is, the model can be updated, for example, on a frame-by-frame or other suitable basis, as the user moves within the physical environment. The current surface reconstructed model is utilized to determine a distance between the user and real world objects in the physical environment in step 1115. The display optics are dimmed for the virtual reality environment to enable transparent operation when the determined distance is less than or equal to a predetermined threshold in step 1120. Rendering of the virtual reality is resumed (i.e., the display is undimmed) when the determined distance exceeds the predetermined threshold in an updated surface reconstructed model in step 1125.

Figure 12:
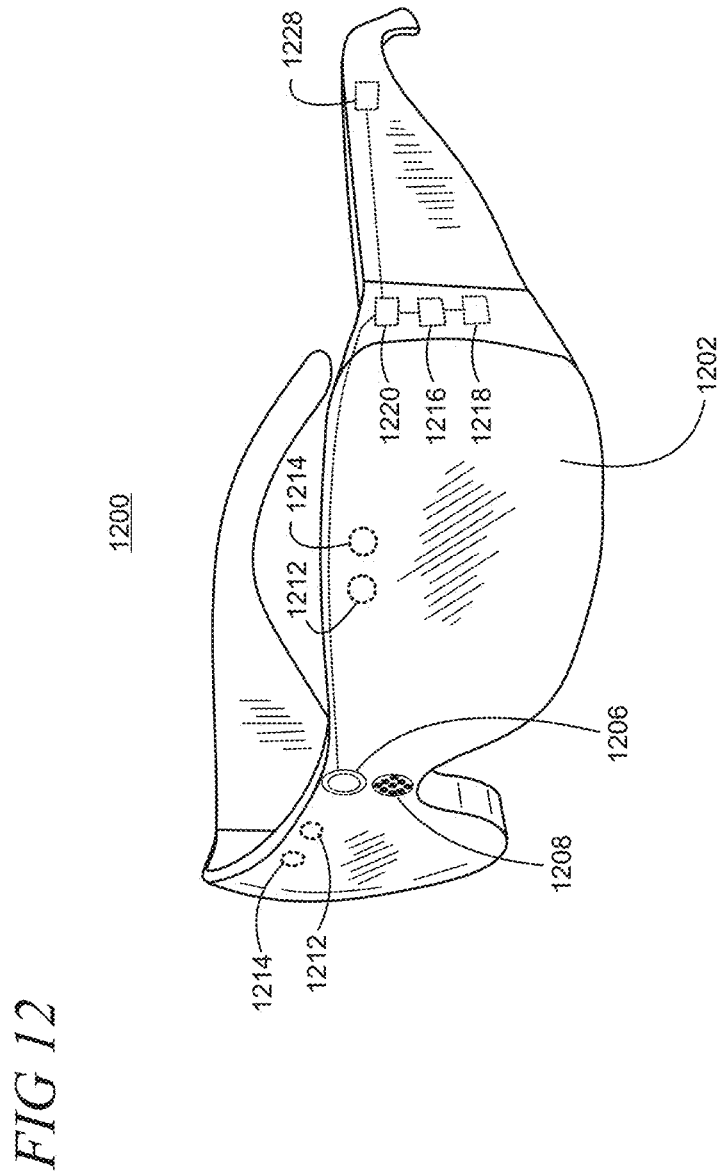
FIG. 12 is a pictorial view of an illustrative example of a mixed reality HMD device.
Figure 13:
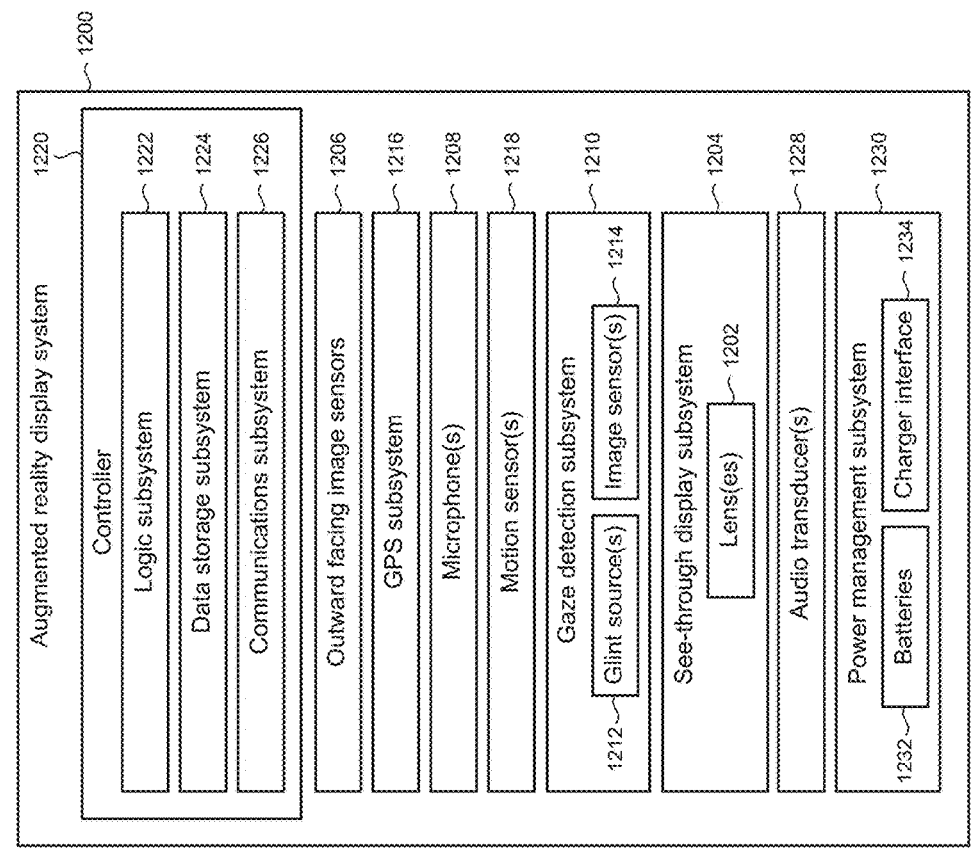
FIG. 13 shows a functional block diagram of an illustrative example of a mixed reality HMD device.
Figure 14:
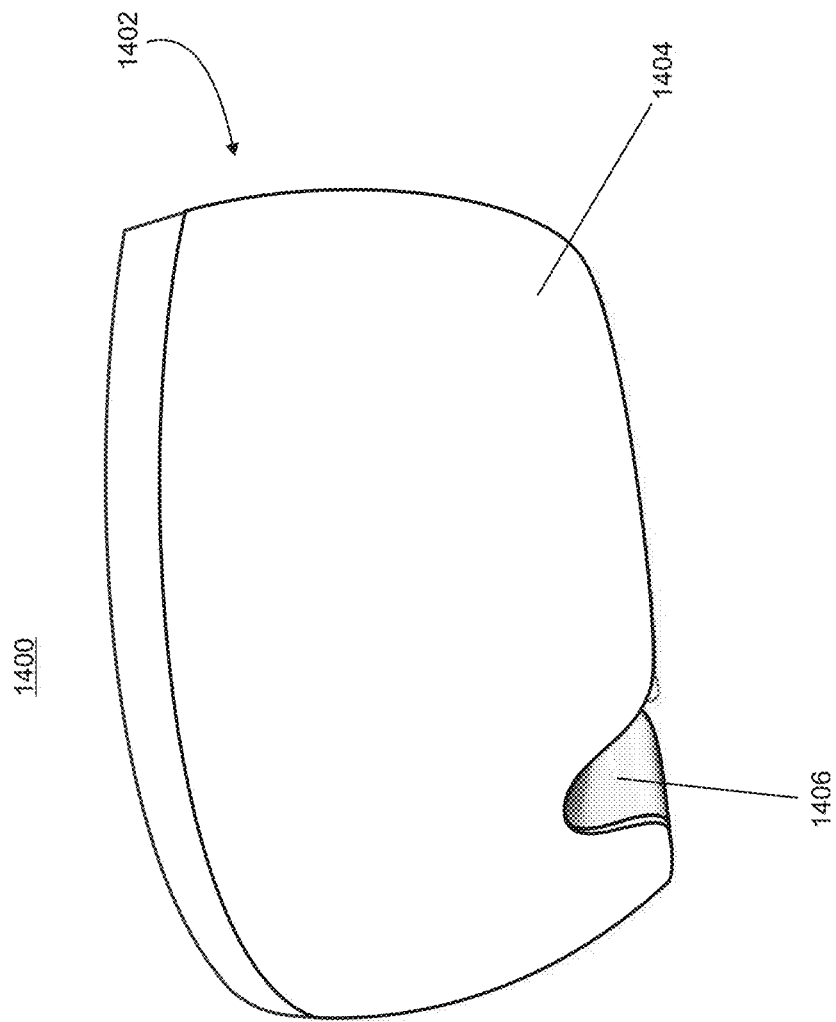
FIGS. 14 and 15 are pictorial front views of a sealed visor that may be used as a component of a mixed reality HMD device.
Figure 15:
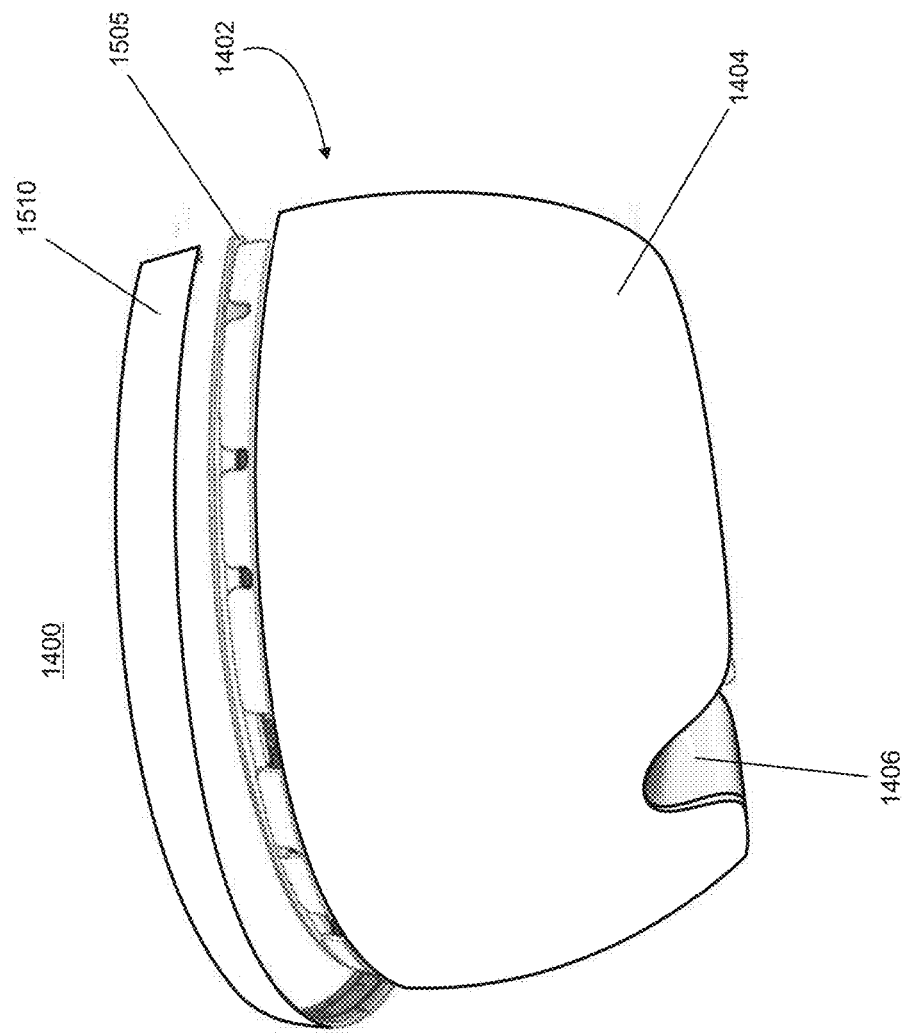

Turning now to various illustrative implementation details, a see-through, mixed reality display device according to the present arrangement may take any suitable form, including but not limited to near-eye devices such as the HMD device 104 and/or other portable/mobile devices. FIG. 12 shows one particular illustrative example of a see-through, mixed reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical space being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, a mixed reality display system, instead of incorporating a see-through display subsystem, may display mixed reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation of an augmented reality HMD device. For examples, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of an augmented reality experience. A power management subsystem 1230 may include one or more batteries 1232 and/or protection circuit modules (PCMs) and an associated charger interface 1234 and/or remote power interface for supplying power to components in the display system 1200.

It may be appreciated that the depicted display devices 104 and 1200 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 14-18 show an illustrative alternative implementation for an augmented reality display system 1400 that may be used as a component of an HMD device. In this example, the system 1400 uses a see-through sealed visor 1402 that is configured to protect the internal optics assembly utilized for the see-through display subsystem. The visor 1402 is typically interfaced with other components of the HMD device (not shown) such as head mounting/retention systems and other subsystems including sensors, power management, controllers, etc., as illustratively described in conjunction with FIGS. 12 and 13. Suitable interface elements (not shown) including snaps, bosses, screws and other fasteners, etc. may also be incorporated into the visor 1402.

The visor includes see-through front and rear shields 1404 and 1406 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1505 as depicted in the partially exploded view in FIG. 15 in which a shield cover 1510 is shown as disassembled from the visor 1402.

The sealed visor 1402 can physically protect sensitive internal components, including an optics display subassembly 1602 (shown in the disassembled view in FIG. 16) when the HMD device is worn and used in operation and during normal handling for cleaning and the like. The visor 1402 can also protect the optics display subassembly 1602 from environmental elements and damage should the HMD device be dropped or bumped, impacted, etc. The optics display subassembly 1602 is mounted within the sealed visor in such a way that the shields do not contact the subassembly when deflected upon drop or impact.

Figure 16:
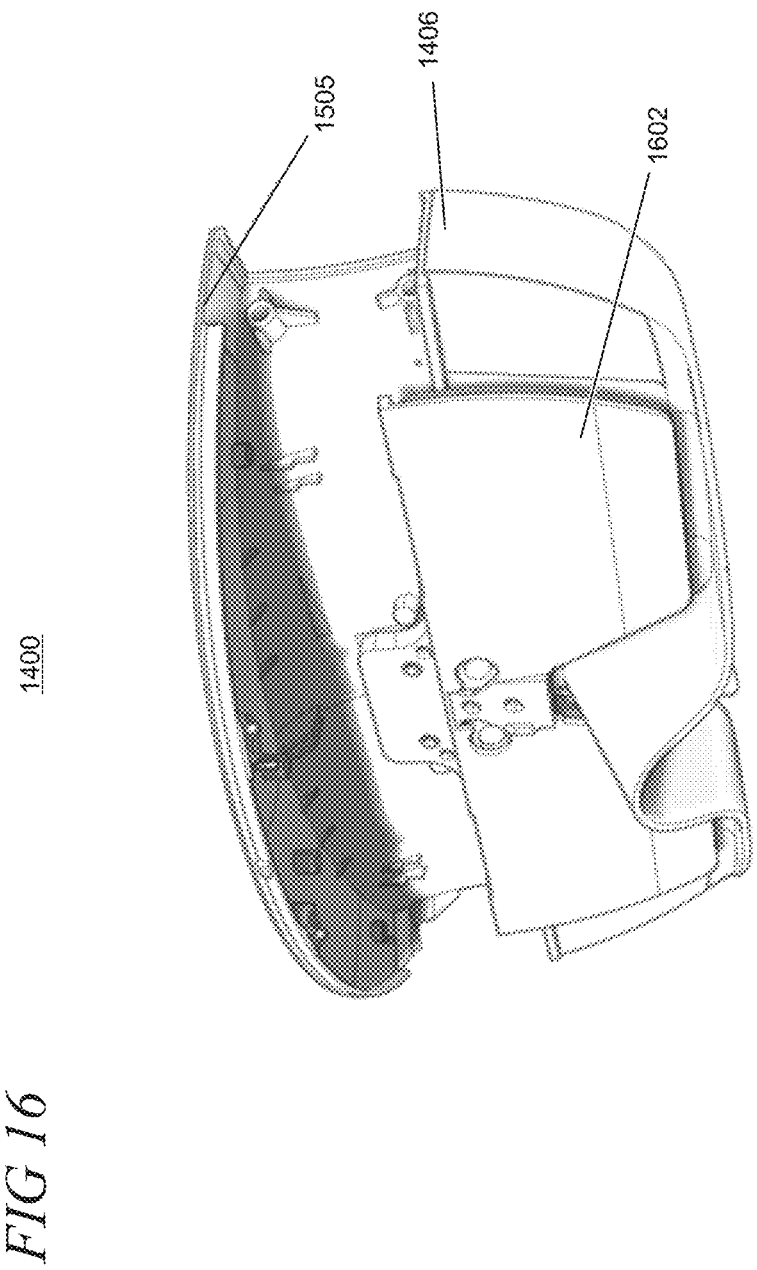
FIG. 16 shows a partially disassembled view of the sealed visor.
Figure 17:
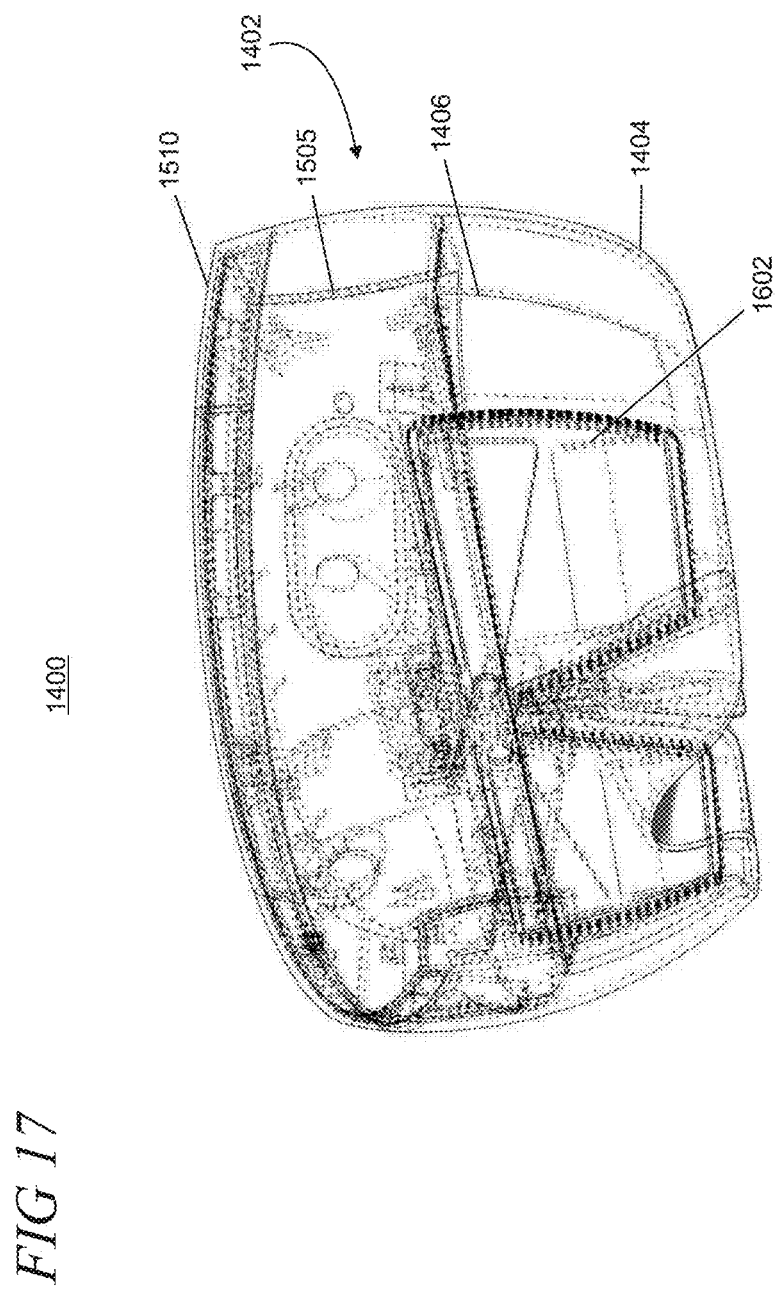
FIG. 17 shows a phantom line front view of the sealed visor.
Figure 18:
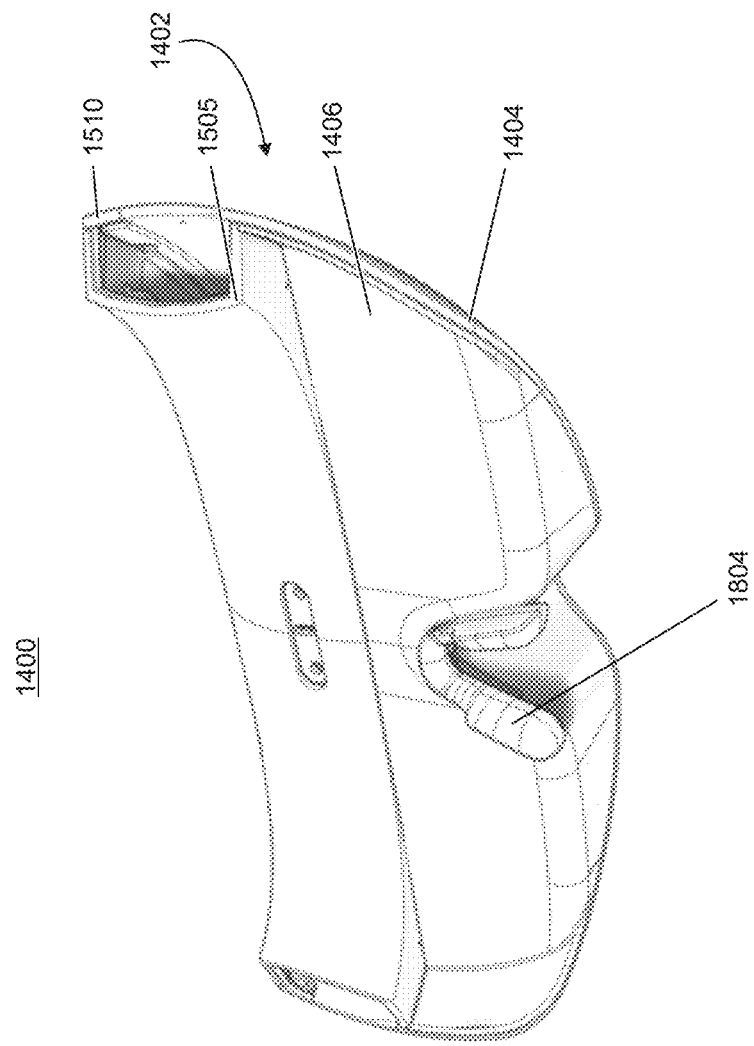
FIG. 18 shows a pictorial back view of the sealed visor.

As shown in FIGS. 16 and 18, the rear shield 1406 is configured in an ergonomically correct form to interface with the user's nose and nose pads 1804 (FIG. 18) and other comfort features can be included (e.g., molded-in and/or added-on as discrete components). The sealed visor 1402 can also incorporate some level of optical diopter curvature (i.e., eye prescription) within the molded shields in some cases.

Figure 19:
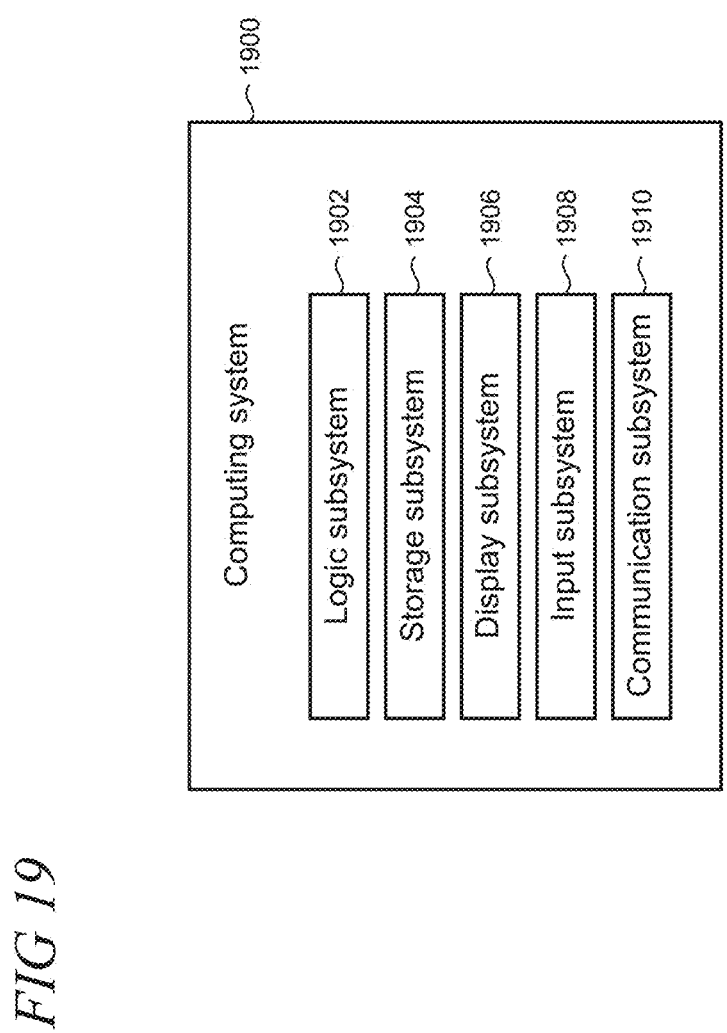
FIG. 19 shows an exemplary computing system.

FIG. 19 schematically shows a non-limiting embodiment of a computing system 1900 that can be used when implementing one or more of the configurations, arrangements, methods, or processes described above. The HMD device 104 may be one non-limiting example of computing system 1900. The computing system 1900 is shown in simplified form. It may be understood that virtually any computer architecture may be used without departing from the scope of the present arrangement. In different embodiments, computing system 1900 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 1900 includes a logic subsystem 1902 and a storage subsystem 1904. The computing system 1900 may optionally include a display subsystem 1906, an input subsystem 1908, a communication subsystem 1910, and/or other components not shown in FIG. 19.

The logic subsystem 1902 includes one or more physical devices configured to execute instructions. For example, the logic subsystem 1902 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 1902 may include one or more processors configured to execute software instructions. Additionally or alternatively, the logic subsystem 1902 may include one or more hardware or firmware logic machines configured to execute hardware or firmware instructions. The processors of the logic subsystem 1902 may be single-core or multi-core, and the programs executed thereon may be configured for sequential, parallel, or distributed processing. The logic subsystem 1902 may optionally include individual components that are distributed among two or more devices, which can be remotely located and/or configured for coordinated processing. Aspects of the logic subsystem 1902 may be virtualized and executed by remotely accessible, networked computing devices configured in a cloud-computing configuration.

The storage subsystem 1904 includes one or more physical devices configured to hold data and/or instructions executable by the logic subsystem 1902 to implement the methods and processes described herein. When such methods and processes are implemented, the state of the storage subsystem 1904 may be transformed—for example, to hold different data.

The storage subsystem 1904 may include removable media and/or built-in devices. The storage subsystem 1904 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 1904 may include volatile, nonvolatile, dynamic, static, read/write, read-only, random-access, sequential-access, location-addressable, file-addressable, and/or content-addressable devices.

It may be appreciated that the storage subsystem 1904 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 1902 and of the storage subsystem 1904 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 1906 may be used to present a visual representation of data held by storage subsystem 1904. This visual representation may take the form of a graphical user interface (GUI). As the present described methods and processes change the data held by the storage subsystem, and thus transform the state of the storage subsystem, the state of the display subsystem 1906 may likewise be transformed to visually represent changes in the underlying data. The display subsystem 1906 may include one or more display devices utilizing virtually any type of technology. Such display devices may be combined with logic subsystem 1902 and/or storage subsystem 1904 in a shared enclosure in some cases, or such display devices may be peripheral display devices in others.

When included, the input subsystem 1908 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 1910 may be configured to communicatively couple the computing system 1900 with one or more other computing devices. The communication subsystem 1910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1900 to send and/or receive messages to and/or from other devices using a network such as the Internet.

Various exemplary embodiments of the present anti-trip when immersed in a virtual reality environment are now presented by way of illustration and not as an exhaustive list of all embodiments. An example includes a method performed by a head mounted display (HMD) device supporting rendering of a virtual reality environment, comprising: obtaining sensor data describing a physical space adjoining a user of the HMD device; using the sensor data, reconstructing geometries of real world objects located in the physical space; determining a distance between the user and the real world objects using the reconstructed geometries; and if the distance is equal to or less than a predetermined threshold, then operating the HMD device so that the user can see the real world objects without obstruction from the virtual reality environment.

In another example, the sensor data includes depth data and further includes generating the sensor data using a depth sensor and applying surface reconstruction techniques to reconstruct the real world object geometries. In another example, the method further includes generating depth data using one or more depth-from-stereo imaging analyses. In another example, the method further includes dimming at least a portion of a see-through display incorporated into the HMD device during the operating. In another example, the method further includes causing at least a portion of a see-through display incorporated into the HMD device to become substantially transparent. In another example, the method further includes representing the user with a volumetric shape and using the volumetric shape when determining the distance between the user and the real world objects. In another example, the method further includes sizing the volumetric shape according to a height of the user's head above the ground of the physical space. In another example, the method further includes varying the predetermined threshold according to the size, shape, or other characteristic of the volumetric shape. In another example, the method further includes configuring the predetermined threshold to be relatively smaller when the user is seated as compared to when the user is standing. In another example, the method further includes using the sensor data to determine a current height of the user.

A further example includes a head mounted display (HMD) device operable by a user in a physical environment, comprising: one or more processors; a see-through display employing additive blending between real world and virtual world display elements; and one or more memory devices storing computer-readable instructions which, when executed by the one or more processors, perform a method comprising the steps of: generating surface reconstruction data using a depth sensor or camera system, using the surface reconstruction data, determining a distance to a real world object in the physical environment from a volumetric shape that represents the user, and operating the HMD device so that at least a portion of the see-through display is seen through by the user when the real world object is within a threshold distance from the volumetric shape.

In another example, the HMD device further includes operating the see-through display by rendering dark pixels for display of the virtual world so that at least a portion of the virtual world does not obscure display of the real world object. In another example, the HMD device further includes a depth sensor arranged for collecting the surface reconstruction data. In another example, the HMD device further includes varying the threshold distance depending on a determination as to whether the user is standing or sitting. In another example, the HMD device further includes modeling the physical environment using a surface reconstruction data pipeline that implements a volumetric method creating multiple overlapping surfaces that are integrated. In another example, the HMD device further includes a sealed protective visor that substantially encases the see-through display.

A further example includes one or more computer readable memories storing computer-executable instructions for implementing a method for providing an anti-trip feature for an immersive virtual environment rendered for a user of a head mounted display (HMD) device in a physical environment, the method comprising the steps of: configuring display optics incorporated into the HMD device for selectively transparent operation by dimming the rendering of the virtual environment; dynamically modeling the physical environment and real world objects contained therein using surface reconstruction; determining a distance from the user to a real world object in the surface reconstructed model; and dimming the display optics for transparent operation to enable the user to see the real world object through the display optics when the distance is equal to or less than a predetermined threshold.

In another example, the one or more computer readable memories further include iteratively performing the steps of dynamically modeling and determining. In another example, the one or more computer readable memories further include undimming the display optics to resume rendering of the virtual environment when the distance exceeds the predetermined threshold. In another example, the predetermined threshold depends on a height of the user's head in the physical environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head mounted display (HMD) device supporting rendering of a virtual reality environment, comprising:
   obtaining sensor data describing a physical space adjoining a user of the HMD device;
   using the sensor data, reconstructing geometries of real world objects located in the physical space;
   representing the user with a volumetric shape that is subject to dynamic variations in size or shape;
   setting a predetermined threshold distance between the user and the real world objects by which to trigger an operation by the HMD device, wherein the predetermined threshold distance is defined as extending from an outer boundary of the volumetric shape to a surface of a respective real world object;
   dynamically adjusting the predetermined threshold distance responsive to one or more variations in the size or shape of the volumetric shape;
   determining a current distance between the user and the real world objects using the reconstructed geometries and the volumetric shape; and
   when the determined current distance is equal to or less than the predetermined threshold distance, triggering the HMD device to operate so that the user can see the real world objects without obstruction from the virtual reality environment.

2. The method of claim 1 in which the sensor data includes depth data and further including generating the sensor data using a depth sensor and applying surface reconstruction techniques to reconstruct the real world object geometries.

3. The method of claim 1 further including generating depth data using one or more depth-from-stereo imaging analyses.

4. The method of claim 1 further including dimming at least a portion of a see-through display incorporated into the HMD device during the triggered operation.

5. The method of claim 1 further including causing at least a portion of a see-through display incorporated into the HMD device to become substantially transparent.

6. The method of claim 1 further including sizing the volumetric shape according to a height of the user's head above a ground of the physical space.

7. The method of claim 6 further including configuring the predetermined threshold distance to be relatively smaller when the user is seated as compared to when the user is standing.

8. The method of claim 6 further including using the sensor data to determine a current height of the user.

9. A head mounted display (HMD) device operable by a user in a physical environment, comprising:
   one or more processors;
   a see-through display employing additive blending between real world and virtual world display elements; and
   one or more memory devices storing computer-readable instructions which, when executed by the one or more processors, perform a method comprising the steps of:
      representing the user with a volumetric shape subject to variations,
      generating surface reconstruction data for real world objects using a depth sensor or camera system,
      setting a predetermined threshold distance between the user and the real world objects by which to trigger an operation by the HMD device, wherein the predetermined threshold distance is defined as extending from an outer boundary of the volumetric shape to a surface of a respective real world object,
      dynamically adjusting the predetermined threshold distance responsive to one or more variations in a size or shape of the volumetric shape, wherein the dynamically adjusted predetermined threshold distance is affected by, but independent of, the variations in size or shape of the volumetric shape,
      determining a current distance to a real world object in the physical environment from the volumetric shape, and
      when the current distance is equal to or less than the predetermined threshold distance, triggering the HMD device to operate so that at least a portion of the see-through display is seen through by the user.

10. The HMD device of claim 9 in which the triggered operation further includes operating the see-through display by rendering dark pixels for display of the virtual world so that at least a portion of the virtual world does not obscure display of the real world object.

11. The HMD device of claim 9 in which the depth sensor is arranged for collecting the surface reconstruction data.

12. The HMD device of claim 9 further including varying the predetermined threshold distance depending on a determination as to whether the user is standing or sitting.

13. The HMD device of claim 9 further including modeling the physical environment using a surface reconstruction data pipeline that implements a volumetric method creating multiple overlapping surfaces that are integrated.

14. The HMD device of claim 9 further including a sealed protective visor that substantially encases the see-through display.

15. One or more computer readable memories storing computer-executable instructions for implementing a method for providing an anti-trip feature for an immersive virtual environment rendered for a user of a head mounted display (HMD) device in a physical environment, the method comprising the steps of:
   configuring display optics incorporated into the HMD device for selectively transparent operation by dimming the rendering of the virtual environment;
   dynamically modeling the physical environment and real world objects contained therein using surface reconstruction;
   determining at least the user's height in the physical environment using the surface reconstruction model;
   representing the user with a volumetric shape, wherein a size or shape of the volumetric shape is at least based on the determined user's height;
   determining a distance from the volumetric shape to a real world object in the surface reconstructed model; and
   dimming the display optics for transparent operation to enable the user to see the real world object through the display optics when the distance is equal to or less than a predetermined threshold, wherein the predetermined threshold is varied according to the size, shape, or other characteristic of the volumetric shape, and wherein the predetermined threshold is defined as extending from an outer boundary of the volumetric shape to a surface of the real world object.

16. The one or more computer readable memories of claim 15 further including iteratively performing the steps of dynamically modeling the physical environment and determining the distance from the volumetric shape to the real world object.

17. The one or more computer-readable memories of claim 16 further including undimming the display optics to resume rendering of the virtual environment when the distance exceeds the predetermined threshold.

* * * * *